(12) United States Patent
Andrus, Jr. et al.

(10) Patent No.: US 8,562,933 B2
(45) Date of Patent: Oct. 22, 2013

(54) HOT SOLIDS PROCESS SELECTIVELY OPERABLE BASED ON ITS PRIMARY PURPOSE

(75) Inventors: Herbert E. Andrus, Jr., Granby, CT (US); John. H. Chiu, West Hartford, CT (US); Gregory N. Liljedahl, Tariffville, CT (US); Paul R. Thibeault, Windsor, CT (US); Carl R. Bozzuto, Enfield, CT (US); Corinne Beal, Voisins le Bretonneux (FR); Michal T. Bialkowski, Untersiggenthal (CH); Andreas Brautsch, Wurenlingen (CH); Laurent Maghdissian, Orsay (FR); Michel Vandycke, Gambais (FR)

(73) Assignee: ALSTOM Technology Ltd, Baden (CH)

( * ) Notice: Subject to any disclaimer, the term of this patent is extended or adjusted under 35 U.S.C. 154(b) by 764 days.

(21) Appl. No.: 12/749,221

(22) Filed: Mar. 29, 2010

(65) Prior Publication Data

US 2010/0284894 A1    Nov. 11, 2010

Related U.S. Application Data

(60) Provisional application No. 61/165,094, filed on Mar. 31, 2009.

(51) Int. Cl.
*C01B 3/02* (2006.01)
*C01B 5/00* (2006.01)
*C10B 3/02* (2006.01)
*C01F 11/46* (2006.01)

(52) U.S. Cl.
USPC ....... 423/437.1; 48/197 R; 252/373; 423/555; 423/580.1; 423/648.1; 423/659

(58) Field of Classification Search
USPC ........ 423/244, 542, 555, 437.1, 580.1, 648.1, 423/659; 48/197 R, 201, 210, 214 A, 213; 252/373
See application file for complete search history.

(56) References Cited

U.S. PATENT DOCUMENTS

| 2,602,809 A | 7/1952 | Dickinson |
| 3,969,089 A | 7/1976 | Moss |

(Continued)

FOREIGN PATENT DOCUMENTS

| EP | 0061326 | 9/1982 |
| EP | 0634470 | 1/1995 |

(Continued)

OTHER PUBLICATIONS

PCT International Search Report and The Written Opinion of the International Searching Authority dated Apr. 2, 2011—(PCT/US2010/029191).

*Primary Examiner* — Wayne Langel
*Assistant Examiner* — Syed Iqbal
(74) *Attorney, Agent, or Firm* — James J. Cummings

(57) ABSTRACT

A hot solids process selectively operable for purposes of generating at least one predetermined output based on what the specific nature of the primary purpose of the hot solids process is for which the at least one predetermined output that is selected from a multiplicity of predetermined outputs, such as H2 and CO2, is being produced, and wherein such primary purpose of the hot solids process is designed to be pre-selected from a group of primary purposes of the hot solids process that includes at least two of the generation of H2 for electric power purposes, the generation of SynGas for electric power production as well as for other industrial uses, the production of steam for electric power generation as well as for other uses, the production of process heat, the production of CO2 for agricultural purposes, and the generation of a feedstock such as H2 for use for the production of liquid hydrocarbons.

13 Claims, 2 Drawing Sheets

(56) References Cited

U.S. PATENT DOCUMENTS

| | | |
|---|---|---|
| 4,111,158 A | 9/1978 | Reh et al. |
| 4,272,399 A | 6/1981 | Davis et al. |
| 4,309,198 A * | 1/1982 | Moss .................... 48/197 R |
| 4,602,573 A | 7/1986 | Tanca |
| 4,704,136 A | 11/1987 | Weston |
| 5,533,471 A | 7/1996 | Hyppänen |
| 6,083,862 A | 7/2000 | Wheelock |
| 7,083,658 B2 | 8/2006 | Andrus Jr. et al. |
| 2004/0031450 A1 | 2/2004 | Chandran |
| 2004/0237404 A1 * | 12/2004 | Andrus et al. .................. 48/101 |
| 2007/0000177 A1 | 1/2007 | Hippo |

FOREIGN PATENT DOCUMENTS

| | | |
|---|---|---|
| GB | 2195096 | 3/1988 |
| GB | 2195096 A * | 3/1988 |
| WO | WO2010/014938 | 2/2010 |

\* cited by examiner

HOT SOLIDS PROCESS SELECTIVELY OPERABLE BASED ON ITS PRIMARY PURPOSE

CROSS-REFERENCE TO RELATED APPLICATIONS

This application claims priority to U.S. provisional application entitled "HOT SOLIDS PROCESS SELECTIVELY OPERABLE BASED ON WHAT THE SPECIFIC NATURE OF THE HOT SOLIDS PROCESS' PRIMARY PURPOSE IS", having Ser. No. U.S. 61/165,094, filed Mar. 31, 2009, which is entirely incorporated herein by reference.

TECHNICAL FIELD

This invention relates generally to hot solids processes that are capable of being selectively operable for purposes of generating at least one predetermined output based on what the specific nature of the hot solids process' primary purpose is. More particularly, the present invention relates to such a hot solids process, which is selectively operable for purposes of generating at least one predetermined output based on what the specific nature of the hot solids process' primary purpose is, wherein such hot solids process' primary purpose is designed to be selected from a group of hot solids process' primary purposes that includes at least two of H2 for electric power production, SynGas for electric power production as well as for other industrial uses, steam production, process heat production, CO2 production for agricultural purposes, and a feedstock such as, by way of exemplification and not limitation, H2 for use for liquid hydrocarbons production.

BACKGROUND

The World today faces a critical challenge as all nations strive to satisfy basic human requirements—food, shelter, clothing and work—that are so dependent on adequate supplies of energy. The great increase in the use of energy has been met mostly by fossil fuels—primarily, coal, oil and gas. The belief is that environmental concerns, security of supply, and economic impacts must all be balanced as the demand for energy continues to increase. Real economic growth and energy use nevertheless still remain inextricably linked.

While the quest for ultimate solutions to provide adequate energy supplies continues, near term, interim solutions must be considered for meeting the immediate growth in demand for energy. Technological improvements in the mining, drilling, moving, processing, and using of fossil fuels can, of course, stretch energy resource reserves, as can a determined effort at conservation of energy. Similarly, the utilization of advanced clean fossil fuel technologies involving the employment of various forms of hot solids processes such as, by way of exemplification and not limitation, fossil fuel gasification, fluidized-bed combustion, or hybrid combustion-gasification fossil fuel technologies are capable of having the effect of that of widening the use of the World's vast fossil fuel resources.

In accordance with the mode of operation of electrical power generation systems, as is well known to most, the steam that is produced by steam generators, which are employed in such electrical power generation systems, from the combustion of fossil fuel therein is designed to be employed in steam turbines. Such steam, which commonly is both at a high temperature and at a high pressure, is expanded in the aforementioned steam turbine in order to thereby effect a rotation of the steam turbine. Such rotation of the steam turbine in turn is operative in a known manner to cause a generator that is suitably operatively connected to the steam turbine to rotate as well. Then, when the generator undergoes such rotation, a conductor is made to move through a magnetic field thereby causing an electric current to be generated. The aforedescribed mode of operation is fundamentally the basis upon which electrical power generation systems continue to be predicated even to this day.

In an effort to realize higher efficiencies for electrical power generation systems, attempts have been known to have been made to increase the temperatures and the pressures at which the steam generators that are employed in such electrical power generation systems are capable of being operated. Such efforts to date have resulted in steam generators being supplied commercially for employment in electrical power generation systems that are capable of being operated at subcritical pressure conditions or that are capable of being operated at supercritical pressure conditions. Improvements in the strength of the materials from which such steam generators, which are intended for employment in electrical power generation systems, are designed to be constructed have permitted such materials, and thus such steam generators, to be operated both at such higher temperatures and at such higher pressures.

Discussing further the advanced clean fossil fuel technologies to which reference has been had above previously wherein various forms of hot solids processes are employed, and in particular to that of fossil fuel gasification technologies, attention is first directed in this connection, by way of exemplification and not limitation, to U.S. Pat. No. 2,602,809, which issued on Jul. 8, 1952 to The M. W. Kellogg Company. The teachings of U.S. Pat. No. 2,602,809 are considered to be representative of an exemplification of an early development in the continuing development of fossil fuel gasification technologies of the type wherein hot solids processes are employed. To this end, in accordance with the teachings thereof, the teachings of U.S. Pat. No. 2,602,809 are directed to a process, which is said to be particularly suited for the gasification of low-grade solid carbon-containing materials. More specifically, insofar as the mode of operation of the process to which the teachings of U.S. Pat. No. 2,602,809 are directed is concerned, the solid carbon-containing materials are designed to be oxidized in order to convert such solid carbon-containing materials to carbon oxides by virtue of the indirect oxidation thereof with air in such a manner that the nitrogen of the air does not contaminate the product gas. Such gasification of the solid carbon-containing materials is accomplished by virtue of the alternate oxidation and reduction of a fluidized metal oxide. According to the teachings of U.S. Pat. No. 2,602,809, solid fuels are subjected to being converted to gases as a consequence of the contacting by a metal oxide with finely-divided solid carbon-containing materials under conditions such as to cause the metal oxide to be reduced and the carbon of the solid fuel to be oxidized to carbon oxides, with the metal oxide being the principal source of oxygen that is required for the oxidation of the carbon. Then, after the metal oxide has been reduced, the reduced metal oxide is subjected to being re-oxidized whereupon the process cycle is capable of being repeated once again.

With further regard to the fossil fuel gasification technologies of the advanced clean fossil fuel technologies to which reference has been had above previously wherein various forms of hot solids processes are employed, attention is next directed herein, by way of exemplification and not limitation, to U.S. Pat. No. 4,602,573, which issued on Jul. 29, 1986 to Combustion Engineering, Inc. The teachings of U.S. Pat. No. 4,602,573 are considered to be representative of an exemplification of a further development in the continuing evolution of fossil fuel gasification technologies of the type wherein hot solids processes are employed. To this end, in accordance with the teachings thereof, the teachings of U.S. Pat. No. 4,602,573 are stated to be directed to a method of gasifying and combusting a carbonaceous fuel and, more particularly to an integrated process wherein a sulfur and nitrogen-bearing carbonaceous fuel is gasified to produce a carbon monoxide-rich low BTU fuel gas that is designed to be subsequently combusted with additional carbonaceous fuel in a steam generator. More specifically, insofar as the mode of operation of the process to which the teachings of U.S. Pat. No. 4,602,573 are directed is concerned, a first portion of sulfur and nitrogen-bearing carbonaceous fuel is gasified in a gasification reactor in a reducing atmosphere of air to produce a hot, char-containing, carbon monoxide-rich fuel gas having a low BTU content. Thereafter, a sulfur capturing material is introduced into the gasification reactor so that the gasifying of the carbonaceous fuel is carried out in the presence of the sulfur capturing material whereby a substantial portion of the sulfur in the carbonaceous fuel being gasified is captured by the sulfur capturing material.

Attention will next be directed herein further to the advanced clean fossil fuel technologies to which reference has been had above previously wherein various forms of hot solids processes are employed and in particular to that of fluidized-bed combustion technologies. Thus, more specifically, attention is therefore directed in this connection, by way of exemplification and not limitation, to U.S. Pat. No. 4,111,158, which issued on Sep. 5, 1978 to Metallgesellschaft Aktiengesellschaft. The teachings of U.S. Pat. No. 4,111,158 are considered to be representative of an exemplification of an early development in the continuing development of the fluidized-bed combustion technologies of the type wherein hot solids processes are employed. To this end, in accordance with the teachings thereof, the teachings of U.S. Pat. No. 4,111,158 are stated to be directed to a method of and an apparatus for carrying out an exothermic process in which a solid feed contains a combustible such as, for example, carbonaceous or sulfurous compounds. Continuing, insofar as the mode of operation of the method of and the apparatus for to which the teachings of U.S. Pat. No. 4,111,158 are directed is concerned, the combustible compounds of the solid feed are designed to be burned under approximately stoichiometric conditions in a fluidized bed. Thereafter, the solids, which are produced as a consequence of such burning of the combustible compounds of the solid feed and which are withdrawn from the fluidized bed are caused to be recycled back to the fluidized bed, while the heat that is produced from such burning of the combustible compounds of the solid feed is available to be recovered.

Regarding further the fluidized-bed combustion technologies of the advanced clean fossil fuel technologies to which reference has been had above previously wherein various forms of hot solids processes are employed, attention is next directed herein, by way of exemplification and not limitation, to U.S. Pat. No. 5,533,471, which issued on Jul. 9, 1996 to A. Ahlstrom Corporation. The teachings of U.S. Pat. No. 5,533,471 are considered to be representative of an exemplification of a further development in the continuing evolution of fluidized-bed combustion technologies of the type wherein hot solids processes are employed. To this end, in accordance with the teachings thereof, the teachings of U.S. Pat. No. 5,533,471 are stated to be directed to a system and to a method that allow the temperature of the fluidized bed reactor to be controlled efficiently, allowing adequate heat transfer surface area for cooling of solid materials. More specifically, insofar as the mode of operation of the system and of the method to which the teachings of U.S. Pat. No. 5,533,471 are directed is concerned, a circulating (fast) fluidized bed and a bubbling (slow) fluidized bed are utilized. Continuing, these two (2) fluidized beds are mounted adjacent each other with first and second interconnections between them, typically with the fluidizing gas introducing grid of the bubbling fluidized bed being below that of the circulating fluidized bed. Because the bubbling fluidized bed has a substantially constant density throughout, with a clear demarcation line at the top thereof, the first interconnection is provided above the top of the bubbling fluidized bed so that the pressure and density conditions between the two (2) fluidized beds result in a flow of particles from the circulating fluidized bed to the bubbling fluidized bed through the first interconnection. However, since the average density in the bubbling fluidized bed is higher than the density in the circulating fluidized bed, the pressure and density conditions cause the particles after treatment in the bubbling fluidized bed (e.g., after the cooling of the particles therein) to return to the circulating fluidized bed through the second interconnection.

Discussing further the advanced clean fossil fuel technologies to which reference has been had above previously wherein various forms of hot solids processes are employed, and in particular that of hybrid combustion-gasification technologies, attention is first directed in this connection, by way of exemplification and not limitation, to U.S. Pat. No. 4,272,399, which issued on Jun. 8, 1981 to the Monsanto Company. The teachings of U.S. Pat. No. 4,272,399 are considered to be representative of an exemplification of an early development in the continuing evolution of the hybrid combustion-gasification technologies of the type wherein hot solids processes are employed. To this end, in accordance with the teachings thereof, the teachings of U.S. Pat. No. 4,272,399 are stated to be directed to a unified process for producing high purity synthesis gas from carbon-containing materials. More specifically, insofar as the mode of operation of the unified process to which the teachings of U.S. Pat. No. 4,272,399 are directed is concerned, a metal-oxygen containing material, which can be characterized as a heat and oxygen carrier and which can be referred generally as an oxidant, is used as the transfer agent of oxygen and heat for oxidatively gasifying carbon-containing material. Continuing, steam, carbon dioxide, synthesis gas or mixtures thereof are employed to fluidize and transport the oxidant through an up-flow, co-current system. Thus, in accordance with the mode of operation of the subject unified process, synthesis gas is first oxidized and heated by the oxidant to form water and carbon dioxide in an oxidant reducing zone prior to contact of the oxidant and gases with the carbon-containing material in a gasifying zone. In addition, the carbon-containing materials are oxidized to predominately carbon monoxide and hydrogen in a manner such that the nitrogen contained in the air does not contaminate the product synthesis gas. Furthermore, the gasification of the carbon-containing material is accomplished by the alternate oxidation and reduction of a fluidized oxidant. Then, after such gasification, the reduced oxidant, which may be in the form of the elemental metal or lower oxidized state is re-oxidized in an oxidizing zone and the cycle is then repeated.

Regarding further the hybrid combustion-gasification technologies of the advanced clean fossil fuel technologies to which reference has been had above previously wherein various forms of hot solids processes are employed, attention is next directed herein, by way of exemplification and not limitation, to U.S. Pat. No. 7,083,658, which issued on Aug. 1, 2006 to ALSTOM Technology Ltd., which is incorporated herein by reference. The teachings of U.S. Pat. No. 7,083,658 are considered to be representative of an exemplification of a further development in the continuing evolution of hybrid combustion-gasification technologies of the type wherein hot solids processes are employed. To this end, in accordance with the teachings thereof, the teachings of U.S. Pat. No. 7,083,658 are stated to be directed to apparatus utilizing fossil fuels, biomass, petroleum coke, or any other carbon bearing fuel to produce hydrogen for power generation, which minimizes or eliminates the release of carbon dioxide ($CO_2$). More specifically, insofar as the mode of operation of the apparatus to which the teachings of U.S. Pat. No. 7,083,658 are directed is concerned, a gasifier is provided for producing a gas product from a carbonaceous fuel, which comprises a first chemical process loop including an exothermic oxidizer reactor and an endothermic reducer reactor. Continuing, the exothermic oxidizer reactor has a CaS inlet, a hot air inlet and a $CaSO_4$/waste gas outlet. Whereas, the endothermic reducer reactor has a $CaSO_4$ inlet in fluid communication with the exothermic oxidizer reactor $CaSO_4$/waste gas outlet, a CaS/gas product outlet in fluid communication with the exothermic oxidizer reactor CaS inlet, and a materials inlet for receiving the carbonaceous fuel. Moreover, CaS is oxidized in air in the exothermic oxidizer reactor to form hot $CaSO_4$, which is discharged to the endothermic reducer reactor. Furthermore, hot $CaSO_4$ and carbonaceous fuel that is received in the endothermic reducer reactor undergo an endothermic reaction utilizing the heat content of the $CaSO_4$ with the carbonaceous fuel stripping the oxygen from the $CaSO_4$ to form CaS and the gas product. Thereafter, the CaS is discharged to the exothermic oxidizer reactor, and with the gas product being discharged from the first chemical process loop.

It is, therefore, an object of the present invention to provide a hot solids process that is selectively operable based on what the specific nature of the hot solids process' primary purpose is.

It is also an object of the present invention to provide such a hot solids process that is capable of being selectively operated for purposes of generating at least one predetermined output.

It is another object of the present invention to provide such a hot solids process that is capable of being selectively operated based on what the specific nature of the hot solids process' primary purpose is for which at least one predetermined output is being produced for purposes of generating such a predetermined output.

It is still another object of the present invention to provide such a hot solids process, which is capable of being selectively operated for purposes of generating at least one predetermined output based on what the specific nature of the hot solids process' primary purpose is for which the at least one predetermined output is being produced, and wherein such hot solids process' primary purpose is designed to be pre-selected from a group of hot solids process' primary purposes.

A further object of the present invention is to provide such a hot solids process that is capable of being selectively operated for purposes of generating at least one predetermined output based on what the specific nature of the hot solids process' primary purpose is for which such at least one pre-determined output is being produced, and wherein such hot solids process' primary purpose is designed to be pre-selected from a group of hot solids process' primary purposes included in which are H2 for electric power production, Syn-Gas for electric power generation as well as for other industrial uses, steam production for electric power generation as well as for other uses, process heat production, $CO_2$ production for agricultural purposes, and a feedstock such as, by way of exemplification and not limitation, H2 for use for liquid hydrocarbons production.

Yet another object of the present invention is to provide such a hot solids process that is relatively inexpensive to provide, that is relatively uncomplicated to employ, and that is characterized by the great versatility, which such a hot solids process embodies insofar as concerns the hot solids process' primary purpose for which at least one predetermined output, which it is desired to produce for such a hot solids process' primary purpose, is capable of being generated through the use of the hot solids process of the present invention.

SUMMARY OF THE INVENTION

In accordance with the present invention a hot solids process is provided, which is capable of being selectively operated for purposes of generating at least one predetermined output selected from a multiplicity of predetermined outputs, such as, by way of exemplification and not limitation, H2 and $CO_2$, based on what the specific nature of the hot solids process' primary purpose is for which the at least one predetermined output is being produced, and wherein such hot solids process' primary purposes is designed to be pre-selected from a group of hot solids process' primary purposes included in which are H2 for electric power production, Syn-Gas for electric power production as well as for other industrial uses, steam production for electric power generation as well as for other uses, process heat production, $CO_2$ production for agricultural purposes, and a feedstock such as, by way of exemplification and not limitation, H2 for use for liquid hydrocarbons production. To this end, the mode of operation, in accordance with the present invention of such a hot solids process, is such that preferably a limestone based sorbent, such as, by way of exemplification and not limitation, CaS, is designed to be combusted in an oxidizing reactor, such oxidizing reactor preferably, by way of exemplification and not limitation, being a circulating bed reactor, in order to thereby produce hot $CaSO_4$ from the combustion of such limestone based sorbent. This hot $CaSO_4$ is then in turn designed to be employed in a reducing reactor, such reducing reactor preferably, by way of exemplification and not limitation, being a circulating bed reactor, for purposes of generating at least one predetermined output based on the nature of the pre-selected hot solids process' primary purpose for which such at least one predetermined output is being produced.

In accordance with a first exemplary embodiment of the mode of operation of the hot solids process of the present invention, the inputs to the oxidizing reactor, which is employed in this first exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this first exemplary embodiment of the mode of operation of the hot solids process of the present invention, which is being produced, is H2 for electric power production, include CaS and air, and the outputs from such an oxidizing reactor in such a case include ash, $CaSO_4$ and N2. Whereas, the inputs to the reducing reactor, which is employed in this first exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this first exemplary embodiment of the mode of operation of the hot solids process of the present invention, which is being produced, is H2 for electric power production, include the solid carbonaceous fuel, CaCO3, steam, and CaSO4, and the output from such a reducing reactor in such a case is designed to be the at least one predetermined output that is being generated based on the specific nature of the hot solids process' primary purpose for which the at least one predetermined output, which is being produced, being H2 for electric power production.

In accordance with a second exemplary embodiment of the mode of operation of the hot solids process of the present invention, the inputs to the oxidizing reactor, which is employed in this second exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this second exemplary embodiment of the mode of operation of the hot solids process of the present invention, which is being produced, is SynGas for electric power production as well as for other industrial uses, include CaS and air, and the outputs from such an oxidizing reactor in such a case include ash, CaSO4 and N2. Whereas, the inputs to the reducing reactor, which is employed in this second exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this second exemplary embodiment of the mode of operation of the hot solids process of the present invention, which is being produced, is SynGas for electric power production as well as for other industrial uses, include the solid carbonaceous fuel, CaCO3, steam, and CaSO4, and the output from such a reducing reactor in such a case is designed to be the at least one predetermined output that is being generated based on the specific nature of the hot solids process' primary purpose for which the at least one predetermined output, which is being produced, being SynGas for electric power generation as well as for other industrial uses.

In accordance with a third exemplary embodiment of the mode of operation of the hot solids process of the present invention, the inputs to the oxidizing reactor, which is employed in this third exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this third exemplary embodiment of the mode of operation of the hot solids process of the present invention, which is being produced, is steam production for electric power generation as well as for other uses, include CaS and air, and the outputs from such an oxidizing reactor in such a case include ash, CaSO4 and N2. Whereas, the inputs to the reducing reactor, which is employed in this third exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this third exemplary embodiment of the mode of operation of the hot solids process of the present invention, which is being produced, is steam production for electric power generation as well as for other uses, include the solid carbonaceous fuel, CaCO3, steam, and CaSO4, and the output from such a reducing reactor in such a case is designed to be the at least one predetermined output that is being generated based on the specific nature of the hot solids process' primary purpose for which the predetermined output, which is being produced, being steam production for electric power generation as well as for other uses.

In accordance with a fourth exemplary embodiment of the mode of operation of the hot solids process of the present invention, the inputs to the oxidizing reactor, which is employed in this fourth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solid process' primary purpose for which the at least one predetermined output that is being generated from this fourth exemplary embodiment of the mode of operation of the hot solids process of the present invention, which is being produced, is process heat production, include CaS and air, and the outputs from such an oxidizing reactor in such a case include ash, CaSO4 and N2. Whereas, the inputs to the reducing reactor, which is employed in this fourth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this fourth exemplary embodiment of the mode of operation of the hot solids process of the present invention, is being produced is process heat production, include the solid carbonaceous fuel, CaCO3, steam, and CaSO4, and the output from such a reducing reactor in such a case is designed to be the at least one predetermined output that is being generated based on the specific nature of the hot solids process' primary purpose for which the at least one predetermined output, which is being produced, being process heat production.

In accordance with a fifth exemplary embodiment of the mode of operation of the hot solids process of the present invention, the inputs to the oxidizing reactor, which is employed in this fifth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this fifth exemplary embodiment of the mode of operation of the hot solids process of the present invention, which is being produced, is CO2 production for agricultural purposes, include CaS and air, and the outputs from such an oxidizing reactor in such a case include ash, CaSO4 and N2. Whereas, the inputs to the reducing reactor, which is employed in this fifth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this fifth exemplary embodiment of the mode of operation of the hot solids process of the present invention, which is being produced, is CO2 production for agricultural purposes, include the solid carbonaceous fuel, CaCO3, steam, and CaSO4, and the output from such a reducing reactor in such a case is designed to be the at least one predetermined output that is being generated based on the specific nature of the hot solids process' primary purpose for which the predetermined output, which is being produced, being CO2 production for agricultural purposes.

In accordance with a sixth exemplary embodiment of the mode of operation of the hot solids process of the present invention, the inputs to the oxidizing reactor, which is employed in this sixth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this sixth exemplary embodiment of the mode of operation of the hot solids process of the present invention, which is being produced, is the generation of a feedstock such as, by way of exemplification and not limitation, H2 for use for liquid hydrocarbons production, include CaS and air, and the outputs from such an oxidizing reactor in such a case include ash, CaSO4 and N2. Whereas, the inputs to the reducing reactor, which is employed in this sixth exemplary embodiment of the mode of operation of the hot solids process of the present invention, when the fuel that is designed to be combusted in accordance therewith comprises a solid carbonaceous fuel, such as, by way of exemplification and not limitation, coal, and when the pre-selected hot solids process' primary purpose for which the at least one predetermined output that is being generated from this sixth exemplary embodiment of the mode of operation of the hot solids process of the present invention, which is being produced, is the generation of H2 for liquid hydrocarbons production, include the solid carbonaceous fuel, CaCO3, steam, and CaSO4, and the output from such a reducing reactor in such a case is designed to be the predetermined output that is being generated based on the specific nature of the hot solids process' primary purpose for which the at least one predetermined output, which is being produced, being the generation of H2 for liquid hydrocarbons production.

DETAILED DESCRIPTION

Figure 1:
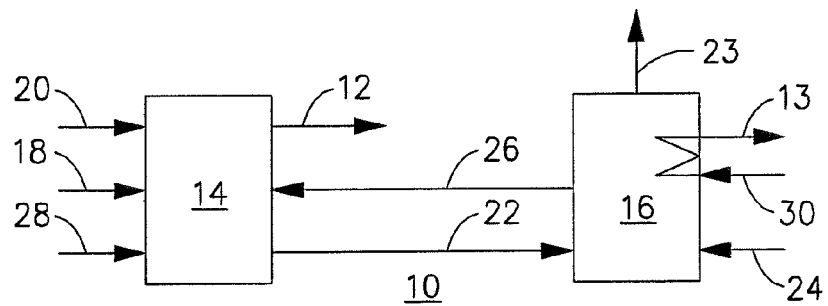
FIG. 1 is a schematic diagram of a hot solids process that functions in accordance with the present invention.

Referring now to FIG. 1 of the drawings, there is depicted therein a schematic diagram of a hot solids process, generally denoted by the reference numeral 10 in FIG. 1 of the drawings, that is designed to be operable in accordance with the present invention for purposes of generating predetermined outputs, and with the latter predetermined outputs being denoted by the arrow 12 and the arrow 13, respectively, in FIG. 1 of the drawings, based on what the specific nature of the hot solids process' primary purpose is for which the predetermined outputs 12, 13 are being produced. In accordance with the mode of operation of the hot solids process of the present invention that is schematically depicted in FIG. 1 of the drawings, the hot solids process' primary purpose, based upon what the specific nature thereof is of which the predetermined outputs 12, 13 are being produced, is designed to be pre-selected from a group of hot solids process' primary purposes included in which at least two are H2 for electric power production, SynGas for electric power production as well as for other industrial uses, steam production for electric power generation as well as for other uses, process heat production, CO2 production for agricultural purposes, and a feedstock such as, by way of exemplification and not limitation, H2 for use for liquid hydrocarbons production.

The hot solids process 10 of the present invention in accordance with the preferred mode of operation thereof is designed to utilize air; a solid carbonaceous fuel, such as, by way of exemplification and not limitation, coal; a source of calcium and steam to effect therewith the generation of the predetermined outputs 12, 13, based on what the specific nature of the hot solids process' primary purpose is for which such predetermined outputs 12, 13 are being produced. To this end, based on what the specific nature of the hot solids process' primary purpose is, which in accordance with the present invention is designed to be pre-selected, such predetermined outputs 12, 13 that are produced in accordance with the mode of operation of the hot solids process 10 of the present invention, are designed such as to be either H2 that is suitable for use for electric power production purposes or SynGas that is suitable for use for electric power production purposes as well as for other industrial uses or CO2 that is suitable for agricultural purposes or a feedstock such as, by way of exemplification and not limitation, H2 that is suitable for use for liquid hydrocarbons production or from the heat that is generated through the use of the hot solids process 10 of the present invention either steam for electric power generation as well as for other uses or process heat.

With further reference to FIG. 1 of the drawings, a reducing reactor, denoted generally by the reference numeral 14 in FIG. 1, and an oxidizing reactor, denoted generally by the reference numeral 16 in FIG. 1, are each designed to be employed in the hot solids process 10 of the present invention, in accordance with the preferred mode of operation thereof. Continuing, in accordance with the preferred embodiment of the hot solids process 10 of the present invention, solid carbonaceous fuel, such as, by way of exemplification and not limitation, coal, and with the latter coal being denoted by the arrow 18 in FIG. 1, which is supplied as an input to the reducing reactor 14, is designed to be burned using air indirectly. To this end, a source of calcium, and with the latter source of calcium being denoted by the arrow 20 in FIG. 1, which is designed to be added, in accordance with the preferred mode of operation of the hot solids process 10 of the present invention, is also supplied, by way of exemplification and not limitation, as an input to the reducing reactor 14. However, such source of calcium 20 could equally well be supplied elsewhere in the hot solids process 10 of the present invention other than as an input to the reducing reactor 14, without departing from the essence of the present invention. Such source of calcium 20, which may be selected from the group consisting of limestone ($CaCO_3$) or lime ($CaO$) or gypsum or the spent bed material from a circulating bed boiler preferably, by way of exemplification and not limitation, comprises limestone ($CaCO_3$). With further reference thereto, such limestone ($CaCO_3$) 20, which is added in accordance with the preferred mode of operation of the hot solids process 10 of the present invention, is designed to be operative to capture in the reducing reactor 14 the sulfur (S), which is contained in the solid carbonaceous fuel 18, such as to thereby produce calcium sulfide (CaS) therefrom in the reducing reactor 14. Such calcium sulfide (CaS), as denoted by the arrow 22 in FIG. 1, is then made to exit from the reducing reactor 14 as an output therefrom, whereupon such calcium sulfide (CaS) 22 is designed to be supplied as an input to the oxidizing reactor 16. In the oxidizing reactor 16, this calcium sulfide (CaS) 22 is burned in a heat liberation reaction with air, and with the latter air being denoted by the arrow 24 in FIG. 1, which is designed to be supplied as an input to the oxidizing reactor 16, such as to thereby effect the production therefrom of calcium sulfate ($CaSO_4$) in the oxidizing reactor 16. This calcium sulfate ($CaSO_4$), as is denoted by the arrow 26 in FIG. 1, is then designed to be made to exit as an output from the oxidizing reactor 16, whereupon this calcium sulfate ($CaSO_4$) is designed to be cycled to the reducing reactor 14 as an input thereto for purposes of thereby providing therefrom the supply of oxygen and of heat that is required both in order to burn the solid carbonaceous fuel 18 and in order to reduce the calcium sulfate ($CaSO_4$) 26 to calcium sulfide (CaS) 22 in the reducing reactor 14 such as to thereby permit a continuous recycling thereof to be had. Continuing, in accordance with the mode of operation of the hot solids process 10 of the present invention, steam, and with the latter steam being denoted by the arrow 28 in FIG. 1, is preferably also supplied as an input to the reducing reactor 14.

Referring once again to FIG. 1 of the drawings, the burning of the solid carbonaceous fuel 18 in the reducing reactor 14 is designed to be such that the predetermined output 12 is thus capable of being generated in the reducing reactor 14, and with the carbon and the hydrogen contained in the solid carbonaceous fuel 18 being converted, in the course of such burning of the solid carbonaceous fuel 18, to a product gas in a suitable form such as to be capable of functioning as the predetermined output 12 that is designed to be generated in accordance with the mode of operation of the hot solids process 10 of the present invention. In addition, through the application thereto of the heat that is liberated during the burning of the calcium sulfide (CaS) 22 in the oxidizing reactor 16, the feedwater, and with the latter feedwater being denoted by the reference numeral 30 in FIG. 1 that is supplied as an input to the oxidizing reactor 16 being designed to be converted to produce the predetermined output 13. Also, as indicated in FIG. 1 by the arrow that is denoted therein by the reference numeral 23, note is taken here of the fact that the nitrogen ($N_2$), which remains from the oxidation of the calcium sulfide (CaS) 22 that takes place in the oxidizing reactor 16, is designed to be made to exit through an outlet (not shown in the interest of maintaining clarity of illustration in the drawings) with which the oxidizing reactor 16 is designed to be suitably provided for this purpose.

Figure 2:
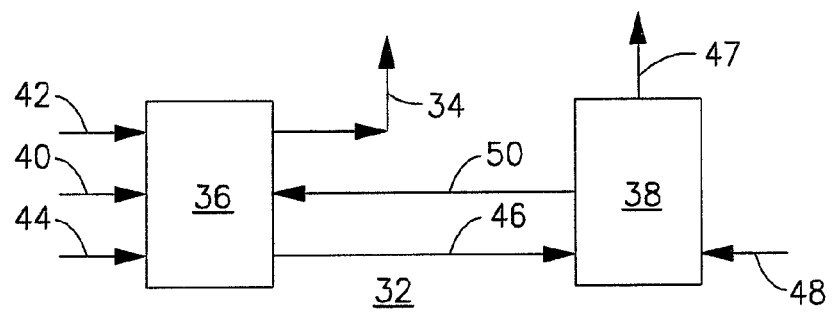
FIG. 2 is a schematic diagram of a first exemplary embodiment of the mode of operation of a hot solids process that functions in accordance with the present invention.

Reference will next be had herein to FIG. 2 of the drawings wherein there is depicted therein a schematic diagram of a first exemplary embodiment, generally denoted by the reference numeral 32 in FIG. 2 of the drawings, of the mode of operation of the hot solids process 10 of the present invention that is designed to be operable in accordance with the present invention for purposes of generating at least one predetermined output, and with the latter at least one predetermined output being denoted by the arrow 34 in FIG. 2 of the drawings, based on the specific nature of the primary purpose of the hot solids process 10 of the present invention, for which the at least one predetermined output 34 is being produced, being that of generating $H_2$ for use for purposes of electric power production. With further reference to FIG. 2 of the drawings, a reducing reactor, denoted generally by the reference numeral 36 in FIG. 2, and an oxidizing reactor, denoted generally by the reference numeral 38 in FIG. 2, are each designed to be employed in the hot solids process 10 of the present invention, in accordance with the first exemplary embodiment 32 of the mode of operation of the hot solids process 10 of the present invention that is operable, in accordance with the present invention, for purposes of generating the at least one predetermined output 34, based on the specific nature of the primary purpose of the hot solids process 10 of the present invention, for which the predetermined output 34 is being produced, being that of generating $H_2$ for use for purposes of electric power production. Continuing, in accordance with the first exemplary embodiment 32 of the mode of operation of the hot solids process 10 of the present invention, solid carbonaceous fuel, such as, by way of exemplification and not limitation, coal, and with the latter coal being denoted by the arrow 40 in FIG. 2, which is designed to be supplied as an input to the reducing reactor 36, is designed to be combusted using air indirectly. To this end, a source of calcium, and with the latter source of calcium being denoted by the arrow 42 in FIG. 2, which is designed to be added, in accordance with the first exemplary embodiment 32 of the mode of operation of the hot solids process 10 of the present invention, is also supplied, by way of exemplification and not limitation, as an input to the reducing reactor 36. However, such source of calcium 20 could equally well be supplied elsewhere in the hot solids process 10 of the present invention other than as an input to the reducing reactor 36, without departing from the essence of the present invention. In addition, note is also made here of the fact that in accordance with the first exemplary embodiment 32 of the hot solids process 10 of the present invention, steam, and with the latter steam being denoted by the arrow 44 in FIG. 2, is preferably supplied as an input to the reducing reactor 36.

Continuing, such source of calcium 42, which may be selected from the group consisting of limestone ($CaCO_3$) or lime ($CaO$) or gypsum or the spent bed material from a circulating bed boiler preferably, by way of exemplification and not limitation, comprises limestone ($CaCO_3$). With further reference thereto, such limestone ($CaCO_3$) 42, which is added in accordance with the first exemplary embodiment 32 of the mode of operation of the hot solids process 10 of the present invention, is designed to be operative to capture in the reducing reactor 36 the sulfur (S), which is contained in the solid carbonaceous fuel 40, such as to thereby produce calcium sulfide (CaS) therefrom in the reducing reactor 36. Such calcium sulfide (CaS), as is denoted by the arrow 46 in FIG. 2, is then made to exit from the reducing reactor 36 as an output therefrom, whereupon such calcium sulfide (CaS) 46 is designed to be supplied as an input to the oxidizing reactor 38. In the oxidizing reactor 38, this calcium sulfide (CaS) 46 is combusted in a heat liberating reaction with air, and with the latter air being denoted by the arrow 48 in FIG. 2, which is designed to be supplied as an input to the oxidizing reactor 38, such as to thereby effect the production therefrom of calcium sulfate (CaSO4) in the oxidizing reactor 38. In addition, as indicated in FIG. 2 by the arrow that is denoted therein by the reference numeral 47, note is taken here of the fact that the nitrogen (N2), which remains from the oxidation of the calcium sulfide (CaS) 46 that takes place in the oxidizing reactor 38, is designed to be made to exit through an outlet (not shown in the interest of maintaining clarity of illustration in the drawings) with which the oxidizing reactor 38 is designed to be suitably provided for this purpose.

With further reference thereto, this calcium sulfate (CaSO4), as is denoted by the arrow 50 in FIG. 2, is then designed to be made to exit as an output from the oxidizing reactor 38, whereupon this calcium sulfate (CaSO4) 50 is designed to be recycled to the reducing reactor 36 as an input thereto for purposes of thereby producing therefrom the supply of oxygen and of heat that is required both in order to effect the combustion of the solid carbonaceous fuel 40 and in order to effect the reduction of the calcium sulfate (CaSO4) 50 to calcium sulfide (CaS) 46 in the reducing reactor 36 such as to thereby permit a continuous recycling thereof to be had. The combustion of the solid carbonaceous fuel 40 in the reducing reactor 36 is designed to be such that the predetermined output 34 is thus capable of being generated in the reducing reactor 36, and with the carbon and the hydrogen contained in the solid carbonaceous fuel 40 being converted, in the course of such combustion of the solid carbonaceous fuel 40, to a product gas, wherein such product gas is designed to be in a suitable form such as to be capable of functioning as the at least one predetermined output 34 that is designed to be generated through the use of the first exemplary embodiment 32 of the mode of operation of the hot solids process 10 of the present invention, based on the specific nature of the primary purpose of the hot solids process 10 of the present invention, for which the predetermined output 34 is being produced, being that of generating H2 for use for purposes of electric power production.

Figure 3:
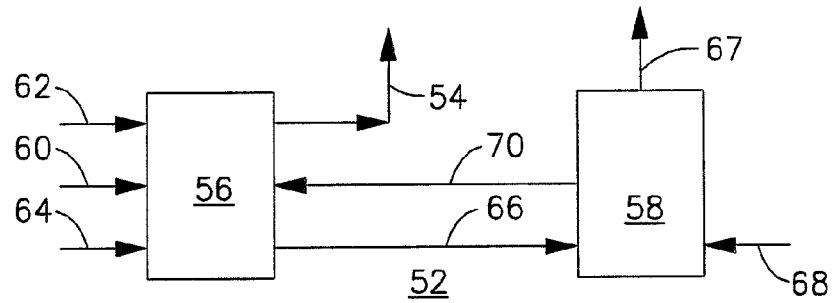
FIG. 3 is a schematic diagram of a second exemplary embodiment of the mode of operation of a hot solids process that functions in accordance with the present invention.

Reference will next be had herein to FIG. 3 of the drawings wherein there is depicted therein a schematic diagram of a second exemplary embodiment, generally denoted by the reference numeral 52 in FIG. 3 of the drawings, of the mode of operation of the hot solids process 10 of the present invention that is designed to be operable in accordance with the present invention for purposes of generating at least one predetermined output, and with the at least one predetermined output being denoted by the arrow 54 in FIG. 3 of the drawings, based on the specific nature of the primary purpose of the hot solids process 10 of the present invention, for which the at least one predetermined output 54 is being produced, being that of generating SynGas for use for purposes of electric power production as well as for other industrial uses. With further reference to FIG. 3 of the drawings, a reducing reactor, denoted generally by the reference numeral 56 in FIG. 3, and an oxidizing reactor, denoted generally by the reference numeral 58 in FIG. 3, are each designed to be employed in the hot solids process 10 of the present invention that is operable, in accordance with the present invention, for purposes of generating the at least one predetermined output 54, based on the specific nature of the primary purpose of the hot solids process 10 of the present invention, for which the at least one predetermined output 54 is being produced, being that of generating SynGas for use for purposes of electric power production. Continuing, in accordance with the second exemplary embodiment 52 of the mode of operation of the hot solids process 10 of the present invention, solid carbonaceous fuel, such as, by way of exemplification and not limitation, coal, and with the latter coal being denoted by the arrow 60 in FIG. 3, which is designed to be supplied as an input to the reducing reactor 56, is designed to be combusted using air indirectly. To this end, a source of calcium, and with the latter source of calcium being denoted by the arrow 62 in FIG. 3, which is designed to be added in accordance with the second exemplary embodiment 52 of the mode of operation of the hot solids process 10 of the present invention, is also supplied, by way of exemplification and not limitation, as an input to the reducing reactor 56. However, such source of calcium 62 could equally well be supplied elsewhere in the hot solids process 10 of the present invention other than as an input to the reducing reactor 56, without departing from the essence of the present invention. In addition, note is also made here of the fact that in accordance with the second exemplary embodiment 52 of the hot solids process 10 of the present invention, steam, and with the latter steam being denoted by the arrow 64 in FIG. 3, is preferably supplied as an input to the reducing reactor 56.

Continuing, such source of calcium 62, which may be selected from the group consisting of limestone (CaCO3) or lime (CaO) or gypsum or the spent bed material from a circulating bed boiler preferably, by way of exemplification and not limitation, comprises limestone (CaCO3). With further reference thereto, such limestone 62, which is added in accordance with the second exemplary embodiment 52 of the mode of operation of the hot solids process 10 of the present invention, is designed to be operative to capture in the reducing reactor 56 the sulfur (S), which is contained in the solid carbonaceous fuel 60, such as to thereby produce calcium sulfide (CaS) therefrom in the reducing reactor 56. Such calcium sulfide (CaS), as is denoted by the arrow 66 in FIG. 3, is then made to exit from the reducing reactor 56 as an output therefrom, whereupon such calcium sulfide (CaS) 66 is designed to be supplied as an input to the oxidizing reactor 58. In the oxidizing reactor 58, this calcium sulfide (CaS) 66 is combusted in a heat liberating reaction with air, and with the latter air being denoted by the arrow 68 in FIG. 3, which is designed to be supplied as an input to the oxidizing reactor 58 such as to thereby effect the production therefrom of calcium sulfate (CaSO4) in the oxidizing reactor 58. In addition, as indicated in FIG. 3 by the arrow denoted therein by the reference numeral 67, note is taken here of the fact that the nitrogen (N2), which remains from the oxidation of the calcium sulfide (CaS) 66 that takes place in the oxidizing reactor 58, is designed to be made to exit through an outlet (not shown in the interest of maintaining clarity of illustration in the drawings) with which the oxidizing reactor 58 is designed to be suitably provided for this purpose.

With further reference thereto, this calcium sulfate (CaSO4), as is denoted by the arrow 70 in FIG. 3, is then designed to be made to exit as an output from the oxidizing reactor 58, whereupon this calcium sulfate (CaSO4) 70 is designed to be recycled to the reducing reactor 56 as an input thereto for purposes of thereby producing therefrom the supply of oxygen and of heat that is required both in order to effect the combustion of the solid carbonaceous fuel 60 and in order to effect the reduction of the calcium sulfate (CaSO4) 70 to calcium sulfide (CaS) 66 in the reducing reactor 56 such as to thereby permit a continuous recycling thereof to be had. The combustion of the solid carbonaceous fuel 60 in the reducing reactor 56 is designed to be such that the predetermined output 54 is thus capable of being generated in the reducing reactor 56, and with the carbon and the hydrogen contained in the solid carbonaceous fuel 60 being converted, in the course of such combustion of the solid carbonaceous fuel 60, to a product gas, wherein such product gas is designed to be in a suitable form such as to be capable of functioning as the at least one predetermined output 54 that is designed to be generated through the use of the second exemplary embodiment 52 of the mode of operation of the hot solids process 10 of the present invention, based on the specific nature of the primary purpose of the hot solids process 10 of the present invention, for which the at least one predetermined output 54 is being produced, being that of generating SynGas for use for purposes of electric power production as well as for other industrial uses.

Figure 4:
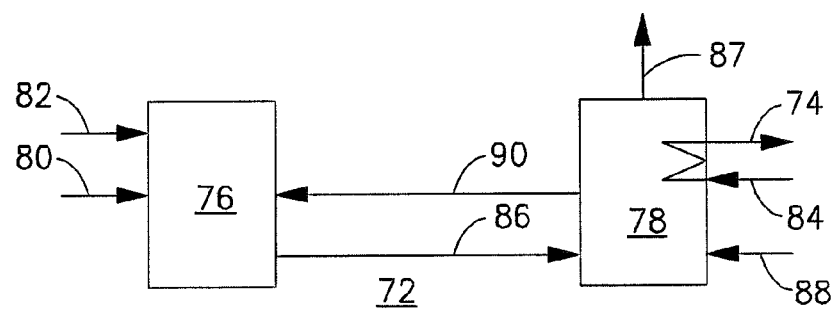
FIG. 4 is a schematic diagram of a third exemplary embodiment of the mode of operation of a hot solids process that functions in accordance with the present invention.

Reference will next be had herein to FIG. 4 of the drawings wherein there is depicted therein a schematic diagram of a third exemplary embodiment, generally denoted by the reference numeral 72 in FIG. 4 of the drawings, of the mode of operation of the hot solids process 10 of the present invention that is designed to be operable in accordance with the present invention for purposes of generating at least one predetermined output, and with the latter at least one predetermined output being denoted by the arrow 74 in FIG. 4 of the drawings, based on the specific nature of the primary purpose of the hot solids process 10 of the present invention, for which the at least one predetermined output 74 is being produced, being that of steam production for electric power generation as well as for other uses. With further reference to FIG. 4 of the drawings, a reducing reactor, denoted generally by the reference numeral 76 in FIG. 4, and an oxidizing reactor, denoted generally by the reference numeral 78 in FIG. 4, are each designed to be employed in the hot solids process 10 of the present invention that is operable, in accordance with the present invention, for purposes of generating the at least one predetermined output 74, based on the specific nature of the primary purpose of the hot solids process 10 of the present invention, for which the at least one predetermined output 74 is being produced, being that of steam production for electric power generation as well as for other uses. Continuing, in accordance with the third exemplary embodiment 72 of the mode of operation of the hot solids process 10 of the present invention, solid carbonaceous fuel, such as, by way of exemplification and not limitation, coal, and with the latter coal being denoted by the arrow 80 in FIG. 4, which is designed to be supplied as an input to the reducing reactor 76, is designed to be combusted using air indirectly. To this end, a source of calcium, and with the latter source of calcium being denoted by the arrow 82 in FIG. 4, which is designed to be added in accordance with the third exemplary embodiment 72 of the mode of operation of the hot solids process 10 of the present invention, is also supplied, by way of exemplification and not limitation, as an input to the reducing reactor 76. However, such source of calcium 82 could equally well be supplied elsewhere in the hot solids process 10 of the present invention other than as an input to the reducing reactor 76, without departing from the essence of the present invention. In addition, note is also made here of the fact that in accordance with the third exemplary embodiment 72 of the hot solids process 10 of the present invention, feedwater, and with the latter feedwater being denoted by the arrow 84 in FIG. 4, is preferably supplied as an input to the oxidizing reactor 78.

Continuing, such source of calcium 82, which may be selected from the group consisting of limestone ($CaCO_3$) or lime (CaO) or gypsum or the spent bed material from a circulating bed boiler preferably, by way of exemplification and not limitation, comprises limestone ($CaCO_3$). With further reference thereto, such limestone ($CaCO_3$) 82, which is added in accordance with the third exemplary embodiment 72 of the mode of operation of the hot solids process 10 of the present invention, is designed to be operative to capture in the reducing reactor 76 the sulfur (S), which is contained in the solid carbonaceous fuel 80, such as to thereby produce calcium sulfide (CaS) therefrom in the reducing reactor 76. Such calcium sulfide (CaS), as is denoted by the arrow 86 in FIG. 4, is then made to exit from the reducing reactor 76 as an output therefrom, whereupon such calcium sulfide (CaS) 86 is designed to be supplied as an input to the oxidizing reactor 78. In the oxidizing reactor 78, this calcium sulfide (CaS) 86 is combusted in a heat liberating reaction with air, and with the latter air being denoted by the arrow 88 in FIG. 4, which is designed to be supplied as an input to the oxidizing reactor 78 such as to thereby effect the production therefrom of calcium sulfate ($CaSO_4$) in the oxidizing reactor 78. Also, as indicated in FIG. 4 by the arrow that is denoted therein by the reference numeral 87, note is taken here of the fact that the nitrogen ($N_2$), which remains from the oxidation of the calcium sulfide (CaS) 86 that takes place in the oxidizing reactor 78, is designed to be made to exit through an outlet (not shown in the interest of maintaining clarity of illustration in the drawings) with which the oxidizing reactor 78 is designed to be suitably provided for this purpose.

With further reference thereto, this calcium sulfate ($CaSO_4$), as is denoted by the arrow 90 in FIG. 4, is then designed to be made to exit as an output from the oxidizing reactor 78, whereupon this calcium sulfate ($CaSO_4$) 90 is designed to be recycled to the reducing reactor 76 as an input thereto for purposes of thereby producing therefrom the supply of oxygen and of heat that is required both in order to effect the combustion of the solid carbonaceous fuel 80 and in order to effect the reduction of the calcium sulfate ($CaSO_4$) 90 to calcium sulfide (CaS) 86 in the reducing reactor 76 such as to thereby permit a continuous recycling thereof to be had. The combustion of the solid carbonaceous fuel 80 in the reducing reactor 76 is designed to be such that the carbon and the hydrogen that is contained in the solid carbonaceous fuel 80 is converted, in the course of such combustion of the solid carbonaceous fuel 80, to a product gas. With further regard to the third exemplary embodiment 72 of the hot solids process 10 of the present invention, in accordance therewith it is through the application thereto of the heat that is liberated during the burning of the calcium sulfide (CaS) 86 in the oxidizing reactor 78 that the feedwater 84, which is designed to be supplied as an input to the oxidizing reactor 78, is designed to be converted to produce therefrom the predetermined output 74 that is generated through the use of the third exemplary embodiment 72 of the mode of operation of the hot solids process 10 of the present invention, based on the specific nature of the primary purpose of the hot solids process 10 of the present invention, for which the at least one predetermined output 74 is being produced, being that of steam production for electric power generation as well as for other uses.

Figure 5:
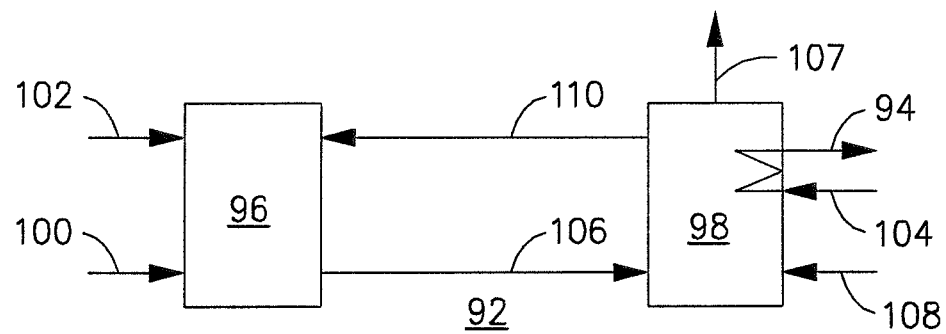
FIG. 5 is a schematic diagram of a fourth exemplary embodiment of the mode of operation of a hot solids process that functions in accordance with the present invention.

Reference will next be had herein in FIG. 5 of the drawings wherein there is depicted therein a schematic diagram of a fourth exemplary embodiment, generally denoted by the reference numeral 92 in FIG. 5 of the drawings, of the mode of operation of the hot solids process 10 of the present invention that is designed to be operable in accordance with the present invention for purposes of generating at least one predetermined output, and with the latter at least one predetermined output being denoted by the arrow 94 in FIG. 5 of the drawings, based on the specific nature of the primary purpose of the hot solids process 10 of the present invention, for which the at least one predetermined output 94 is being produced, being that of process heat production. With further reference to FIG. 5 of the drawings, a reducing reactor, denoted generally by the reference numeral 96 in FIG. 5, and an oxidizing reactor, denoted generally by the reference numeral 98 in FIG. 5, are each designed to be employed in the hot solids process 10 of the present invention that is operable, in accordance with the present invention, for purposes of generating the at least one predetermined output 94, based on the specific nature of the primary purpose of the hot solids process 10 of the present invention, for which the at least one predetermined output 94 is being produced, being that of process heat production. Continuing, in accordance with the fourth exemplary embodiment 92 of the mode of operation of the hot solids process 10 of the present invention, solid carbonaceous fuel, such as, by way of exemplification and not limitation, coal, and with the latter coal being denoted by the arrow 100 in FIG. 5, which is designed to be supplied as an input to the reducing reactor 96, is designed to be combusted using air indirectly. To this end, a source of calcium, and with the latter source of calcium being denoted by the arrow 102 in FIG. 5, which is designed to be added, in accordance with the fourth exemplary embodiment 92 of the mode of operation of the hot solids process 10 of the present invention, is also supplied, by way of exemplification and not limitation, as an input to the reducing reactor 96. However, such source of calcium 102 could equally well be supplied elsewhere in the hot solids process 10 of the present invention other than as an input to the reducing reactor 96, without departing from the essence of the present invention. In addition, note is also made here of the fact that in accordance with the fourth exemplary embodiment 92 of the hot solids process 10 of the present invention, feedwater, and with the latter feedwater being denoted by the arrow 104 in FIG. 5, is preferably supplied as an input to the oxidizing reactor 98.

Continuing, such source of calcium 102, which may be selected from the group consisting of limestone ($CaCO_3$) or lime (CaO) or gypsum or the spent bed material from a circulating bed boiler preferably, by way of exemplification and not limitation, comprises limestone ($CaCO_3$). With further reference thereto, such limestone ($CaCO_3$) 102, which is added in accordance with the fourth exemplary embodiment 92 of the mode of operation of the hot solids process 10 of the present invention, is designed to be operative to capture in the reducing reactor 96 the sulfur (S), which is contained in the solid carbonaceous fuel 100, such as to thereby produce calcium sulfide (CaS) in the reducing reactor 96. Such calcium sulfide (CaS), as is denoted by the arrow 106 in FIG. 5, is then made to exit from the reducing reactor 96 as an output therefrom, whereupon such calcium sulfide (CaS) 106 is designed to be supplied as an input to the oxidizing reactor 98. In the oxidizing reactor 98, this calcium sulfide (CaS) 106 is combusted in a heat liberating reaction with air, and with the latter air being denoted by the arrow 108 in FIG. 5, which is designed to be supplied as an input to the oxidizing reactor 98 such as to thereby effect the production therefrom of calcium sulfate ($CaSO_4$) in the oxidizing reactor 98. Also, as indicated in FIG. 5 by the arrow that is denoted therein by the reference numeral 107, note is taken here of the fact that the nitrogen ($N_2$), which remains from the oxidation of the calcium sulfide (CaS) 106 that takes place in the oxidizing reactor 98, is designed to be made to exit through an outlet (not shown in the interest of maintaining clarity of illustration in the drawings) with which the oxidizing reactor 98 is designed to be suitably provided for this purpose.

With further reference thereto, this calcium sulfate ($CaSO_4$), as denoted by the arrow 110 in FIG. 5, is then designed to be made to exit as an output from the oxidizing reactor 98, whereupon this calcium sulfate ($CaSO_4$) 110 is designed to be recycled to the reducing reactor 96 as an input thereto for purposes of thereby producing therefrom the supply of oxygen and of heat that is required both in order to effect the combustion of the solid carbonaceous fuel 100 and in order to effect the reduction of the calcium sulfate ($CaSO_4$) 110 to calcium sulfide (CaS) 106 in the reducing reactor 96 such as to thereby permit a continuous recycling thereof to be had. The combustion of the solid carbonaceous fuel 100 in the reducing reactor 96 is designed to be such that the carbon and the hydrogen that is contained in the solid carbonaceous fuel 100 is converted, in the course of such combustion of the solid carbonaceous fuel 100, to a product gas. With further regard to the fourth exemplary embodiment 92 of the hot solids process 10 of the present invention, in accordance therewith it is through the application thereto of the heat that is liberated during the burning of the calcium sulfide (CaS) 106 in the oxidizing reactor 98 that the feedwater 104, which is designed to be supplied as an input to the oxidizing reactor 98, is designed to be converted to produce therefrom the at least one predetermined output 94 that is generated through the use of the fourth exemplary embodiment 92 of the mode of operation of the hot solids process 10 of the present invention, based on the specific nature of the primary purpose of the hot solids process 10 of the present invention, for which the at least one predetermined output 94 is being produced, being that of process heat production.

Figure 6:
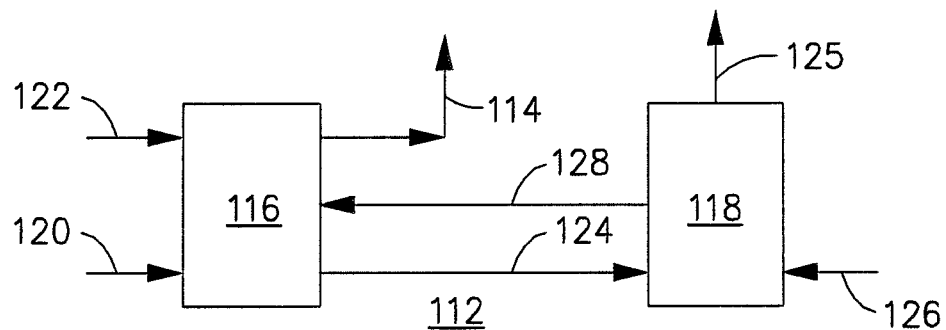
FIG. 6 is a schematic diagram of a fifth exemplary embodiment of the mode of operation of a hot solids process that functions in accordance with the present invention.

Reference will next be had herein to FIG. 6 of the drawings wherein there is depicted therein a schematic diagram of a fifth exemplary embodiment, generally denoted by the reference numeral 112 in FIG. 6 of the drawings, of the mode of operation of the hot solids process 10 of the present invention that is designed to be operable in accordance with the present invention for purposes of generating at least one predetermined output, and with the latter at least one predetermined output being denoted by the arrow 114 in FIG. 6 of the drawings, based on the specific nature of the primary purpose of the hot solids process 10 of the present invention, for which the at least one predetermined output 114 is being produced, being that of generating $CO_2$ for use for agricultural purposes. With further reference to FIG. 6 of the drawings, a reducing reactor, denoted generally by the reference numeral 116 in FIG. 6, and an oxidizing reactor, denoted generally by the reference numeral 118 in FIG. 6, are each designed to be employed in the hot solids process 10 of the present invention that is operable, in accordance with the present invention, for purposes of generating the at least one predetermined output 114, based on the specific nature of the primary purpose of the hot solids process 10 of the present invention for which the predetermined output 114 is being produced, being that of generating $CO_2$ for use for agricultural purposes. Continuing, in accordance with the fifth exemplary embodiment 112 of the mode of operation of the hot solids process 10 of the present invention, solid carbonaceous fuel, such as, by way of exemplification and not limitation, coal, and with the latter coal being denoted by the arrow 120 in FIG. 6, which is designed to be supplied as an input to the reducing reactor 116, is designed to be combusted using air indirectly. To this end, a source of calcium, and with the latter source of calcium being denoted by the arrow 122 in FIG. 6, which is designed to be added in accordance with the fifth exemplary embodiment 112 of the mode of operation of the hot solids process 10 of the present invention, is also supplied, by way of exemplification and not limitation, as an input to the reducing reactor 116. However, such source of calcium 122 could equally well be supplied elsewhere in the hot solids process 10 of the present invention other than as an input to the reducing reactor 116, without departing from the essence of the present invention.

Continuing, such source of calcium 122, may be selected from the group consisting of limestone (CaCO3) or lime (CaO) or gypsum or the spent bed material from a circulating bed boiler preferably, by way of exemplification and not limitation, comprises limestone (CaCO3). With further reference thereto, such limestone (CaCO3) 122, which is added in accordance with the fifth exemplary embodiment 112 of the mode of operation of the hot solids process 10 of the present invention, is designed to be operative to capture in the reducing reactor 116 the sulfur (S), which is contained in the solid carbonaceous fuel 120, such as to thereby produce calcium sulfide (CaS) in the reducing reactor 116. Such calcium sulfide (CaS), as is denoted by the arrow 124 in FIG. 6, is then made to exit from the reducing reactor 116 as an output therefrom, whereupon such calcium sulfide (CaS) 124 is designed to be supplied as an input to the oxidizing reactor 118. In the oxidizing reactor 118, this calcium sulfide (CaS) 124 is combusted in a heat liberating reaction with air, and with the latter air being denoted by the arrow 126 in FIG. 6, which is designed to be supplied as an input to the oxidizing reactor 118 such as to thereby effect the production of calcium sulfate (CaSO4) in the oxidizing reactor 118. Also, as indicated in FIG. 5 by the arrow that is denoted therein by the reference numeral 125, note is taken here of the fact that nitrogen (N2), which remains from the oxidation of the calcium sulfide (CaS) 124 that takes place in the oxidizing reactor 118, is designed to be made to exit through an outlet (not shown in the interest of maintaining clarity of illustration in the drawings) with which the oxidizing reactor 118 is designed to be suitably provided for this purpose.

With further reference thereto, this calcium sulfate (CaSO4), as denoted by the arrow 128 in FIG. 6, is then designed to be made to exit as an output from the oxidizing reactor 118, whereupon this calcium sulfate (CaSO4) 128 is designed to be recycled to the reducing reactor 116 as an input thereto for purposes of thereby producing the supply of oxygen and of heat that is required both in order to effect the combustion of the solid carbonaceous fuel 120 and in order to effect the reduction of the calcium sulfate (CaSO4) 128 to calcium sulfide (CaS) 124 in the reducing reactor 116 such as to thereby permit a continuous recycling thereof to be had. The combustion of the solid carbonaceous fuel 120 in the reducing reactor 116 is designed to be such that the at least one predetermined output 114 is thus generated in the reducing reactor 116 with the carbon and the hydrogen that is contained in the solid carbonaceous fuel 120 being converted, in the course of such combustion of the solid carbonaceous fuel 120, to a product gas, wherein such product gas is designed to be in a suitable form such as to be capable of functioning as the predetermined output 114 that is generated through the use of the fifth exemplary embodiment 112 of the mode of operation of the hot solids process 10 of the present invention, based on the specific nature of the primary purpose of the hot solids process 10 of the present invention, for which the at least one predetermined output 114 is being produced, being that of generating CO2 for use for agricultural purposes.

Figure 7:
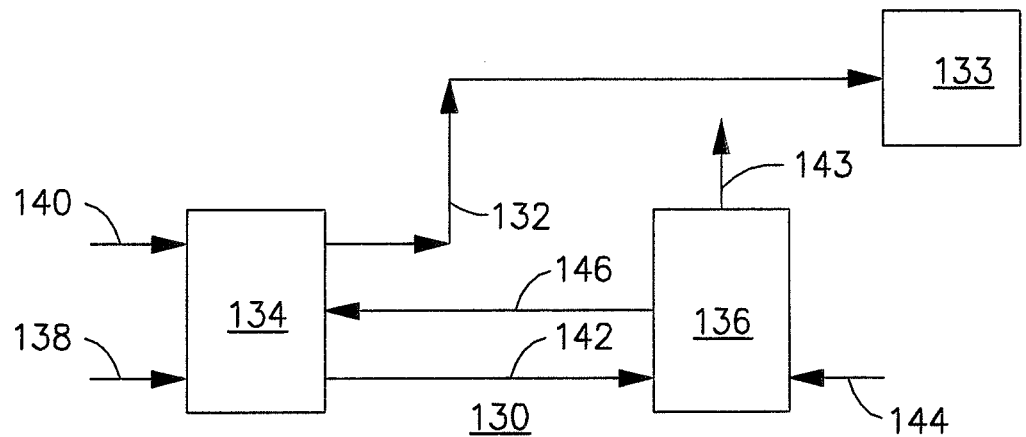
FIG. 7 is a schematic diagram of a sixth exemplary embodiment of the mode of operation of a hot solids process that functions in accordance with the present invention.

Reference will next be had herein to FIG. 7 of the drawings wherein there is depicted therein a schematic diagram of a sixth exemplary embodiment, generally denoted by the reference numeral 130 in FIG. 7 of the drawings, of the mode of operation of the hot solids process 10 of the present invention that is designed to be operable in accordance with the present invention for purposes of generating at least one predetermined output, and with the latter at least one predetermined output being denoted by the arrow 132 in FIG. 7 of the drawings, based on the specific nature of the primary purpose of the hot solids process 10 of the present invention, for which the at least one predetermined output 132 is being produced, being that of generating a feedstock such as, by way of exemplification and not limitation, H2 for use for liquid hydrocarbons production. As depicted in FIG. 7, the at least one predetermined output 132 in the form of a feedstock such as, by way of exemplification and not limitation, H2 that is suitable for use for liquid hydrocarbons production is designed to be supplied to a means suitable for effecting therewith the production of liquid hydrocarbons, the latter means for effecting therewith the production of liquid hydrocarbons being shown at 133 in FIG. 7.

With further reference to FIG. 7 of the drawings, a reducing reactor, denoted generally by the reference numeral 134 in FIG. 7, and an oxidizing reactor, denoted generally by the reference numeral 136 in FIG. 7, are each designed to be employed in the hot solids process 10 of the present invention that is operable, in accordance with the present invention, for purposes of generating the at least one predetermined output 132, based on the specific nature of the primary purpose of the hot solids process 10 of the present invention, for which the at least one predetermined output 132 is being produced, being that of generating a feedstock, such as, by way of exemplification and not limitation, H2 for use for liquid hydrocarbons production. Continuing, in accordance with the sixth exemplary embodiment 130 of the mode of operation of the hot solids process 10 of the present invention, solid carbonaceous fuel, such as, by way of exemplification and not limitation, coal, and with the latter coal being denoted by the arrow 138 in FIG. 7, which is designed to be supplied as an input to the reducing reactor 134, is designed to be combusted using air indirectly. To this end, a source of calcium, and with the latter source of calcium being denoted by the arrow 140 in FIG. 7, which is designed to be added, in accordance with the sixth exemplary embodiment 130 of the mode of operation of the hot solids process 10 of the present invention, is also supplied, by way of exemplification and not limitation, as an input to the reducing reactor 134. However, such source of calcium 140 could equally well be supplied elsewhere in the hot solids process 10 of the present invention other than as an input to the reducing reactor 134, without departing from the essence of the present invention.

Continuing, such source of calcium 140, which may be selected from the group consisting of limestone (CaCO3) or lime (CaO) or gypsum or the spent bed material from a circulating bed boiler preferably, by way of exemplification and not limitation, comprises limestone (CaCO3). With further reference thereto, such limestone (CaCO3) 140, which is added in accordance with the sixth exemplary embodiment 130 of the mode of operation of the hot solids process 10 of the present invention, is designed to be operative to capture in the reducing reactor 134 the sulfur (S), which is contained in the solid carbonaceous fuel 138, such as to thereby produce calcium sulfide (CaS) in the reducing reactor 134. Such calcium sulfide (CaS), as is denoted by the arrow 142 in FIG. 7, is then made to exit from the reducing reactor 134 as an output therefrom, whereupon such calcium sulfide (CaS) 142 is designed to be supplied as an input to the oxidizing reactor 136. In the oxidizing reactor 136, this calcium sulfide (CaS) 142 is combusted in a heat liberating reaction with air, and with the latter air being denoted by the arrow 144 in FIG. 7, which is designed to be supplied as an input to the oxidizing reactor 136 such as to thereby effect the production therefrom of calcium sulfide (CaSO4) in the oxidizing reactor 136. Also, as indicated in FIG. 6 by the arrow that is denoted therein by the reference numeral 143, note is taken here of the fact that the nitrogen (N2), which remains from the oxidation of the calcium sulfide (CaS) 142 that takes place in the oxidizing reactor 136, is designed to be made to exit through an outlet (not shown in the interest of maintaining clarity of illustration in the drawings) with which the oxidizing reactor 136 is designed to be suitably provided for this purpose.

With further reference thereto, this calcium sulfate (CaSO4), as denoted by the arrow 146 in FIG. 7, is then designed to be made to exit as an output from the oxidizing reactor 136, whereupon this calcium sulfate (CaSO4) 146 is designed to be recycled to the reducing reactor 134 as a input thereto for purposes of thereby producing therefrom the supply of oxygen and of heat that is required both in order to effect the combustion of the solid carbonaceous fuel 138 and in order to effect the reduction of the calcium sulfate (CaSO4) 146 to calcium sulfide (CaS) 142 in the reducing reactor 134 such as to thereby permit a continuous recycling thereof to be had. The combustion of the solid carbonaceous fuel 138 in the reducing reactor 134 is designed to be such that the at least one predetermined output 132 is thus generated in the reducing reactor 134 with the carbon and the hydrogen that is contained in the solid carbonaceous fuel 138 being converted, in the course of such combustion of the solid carbonaceous fuel 138, to a product gas, wherein such product gas is designed to be in a suitable form such as to be capable of functioning as the at least one predetermined output 132 that is generated through the use of the sixth exemplary embodiment 130 of the mode of operation of the hot solids process 10 of the present invention, based on the specific nature of the primary purpose of the hot solids process 10 of the present invention, for which the at least one predetermined output 130 is being produced, being that of generating a feedstock such as, by way of exemplification and not limitation, H2 for use for liquid hydrocarbons production.

While preferred embodiments of the present invention have been shown and described in the instant application, it is to be understood that various modifications and substitutions may be made thereto without departing from the spirit and scope of the present invention as set forth in the claims that are appended hereto. Accordingly, it is to be further understood that the present invention, as the present invention has been described herein, has been described by way of illustration and not limitation.

What is claimed is:

1. A hot solids process selectively operable for purposes of generating at least one predetermined output, based on what the specific nature of the primary purpose of the hot solids process is for which the at least one predetermined output is being produced, comprising:

pre-selecting a primary purpose of the hot solids process from a group of primary purposes of the hot solids process, which includes at least two members selected from the group consisting of the generation of a feedstock such as $H_2$ for use for purposes of electric power production, the generation of syngas for use for purposes of electric power production as well as for other industrial uses, production of steam for electric power generation as well as for other uses, production of process heat, the production of $CO_2$ for agricultural purposes, and the generation of $H_2$ for use for the production of liquid hydrocarbons;

providing a first reactor capable of being operated as a reducing reactor;

providing a second reactor capable of being operated as an oxidizing reactor;

supplying as inputs to the reducing reactor both a sulfur containing solid carbonaceous fuel and a source of calcium;

supplying air as an input to the oxidizing reactor;

effecting in the reducing reactor with the source of calcium the capture of the sulfur in the sulfur containing solid carbonaceous fuel to thereby produce CaS in the reducing reactor;

effecting the discharge of the CaS as an output from the reducing reactor and then supplying such CaS as an input to the oxidizing reactor;

effecting in the oxidizing reactor the production of $CaSO_4$ from the CaS that is supplied as an input to the oxidizing reactor;

supply feedwater to the oxidizing reactor; where the feedwater is converted to steam for electrical power generation;

effecting the discharge of the $CaSO_4$ that is produced in the oxidizing reactor as an output from the oxidizing reactor and then supplying such $CaSO_4$ as an input to the reducing reactor;

selectively generating at least one predetermined output based on what the specific nature of the primary purpose of the hot solids process is for which the at least one predetermined output is being produced from the performance of one of the following wherein $CaSO_4$ is utilized in the reducing reactor both as an oxygen source and as a heat source in order to thereby effect the generation in the reducing reactor of the at least one predetermined output from the sulfur containing solid carbonaceous fuel and wherein CaS is burned in a heat liberating reaction in the oxidizing reactor to effect the generation of the at least one predetermined output in the oxidizing reactor from the heat liberated during the burning of the CaS in the oxidizing reactor; and effecting the discharge of the at least one predetermined output that is selectively generated in one of the reducing reactor and oxidizing reactor.

2. The hot solids process as claimed in claim 1 further comprising supplying steam as an additional input to the reducing reactor.

3. The hot solids process as claimed in claim 2 wherein the specific nature of the pre-selected primary purpose of the hot solids process for which the at least one predetermined output is being produced is the generation of H2 for use for electric power production.

4. The hot solids process as claimed in claim 3 wherein the at least one predetermined output is selectively generated in the reducing reactor; and the at least one predetermined output that is selectively generated in the reducing reactor is discharged from the reducing reactor.

5. The hot solids process as claimed in claim 2 wherein the specific nature of the pre-selected primary purpose of the hot solids process for which the at least one predetermined output is being produced is the generation of SynGas for use for electric power production as well as for other industrial uses.

6. The hot solids process as claimed in claim 5 wherein the at least one predetermined output is selectively generated in the reducing reactor, and wherein the at least one predetermined output that is selectively generated in the reducing reactor is discharged from the reducing reactor.

7. The hot solids process as claimed in claim 1 wherein the at least one predetermined output is selectively generated in the oxidizing reactor, and wherein the at least one predetermined output that is selectively generated in the oxidizing reactor is discharged from the oxidizing reactor.

8. The hot solids process as claimed in claim 1 wherein the specific nature of the pre-selected primary purpose of the hot solids process for which the at least one predetermined output is being produced is the production of process heat.

9. The hot solids process as claimed in claim 1 wherein the at least one predetermined output is selectively generated in the oxidizing reactor, and wherein the at least one predetermined output that is selectively generated in the oxidizing reactor is discharged from the oxidizing reactor.

10. The hot solids process as claimed in claim 1 wherein the specific nature of the pre-selected primary purpose of the hot solids process for which the at least one predetermined output is being produced is the production of CO2 for agricultural purposes.

11. The hot solids process as claimed in claim 10 wherein the at least one predetermined output is selectively generated in the reducing reactor, and wherein the at least one predetermined output that is selectively generated in the reducing reactor is discharged from the reducing reactor.

12. The hot solids process as claimed in claim 1 wherein the specific nature of the pre-selected primary purpose of the hot solids process for which the at least one predetermined output is being produced is the generation of a feedstock such as H2 for use for the production of liquid hydrocarbons.

13. The hot solids process as claimed in claim 12 wherein the at least one predetermined output is selectively generated in the reducing reactor, and wherein the at least one predetermined output that is selectively generated in the reducing reactor is discharged from the reducing reactor.

* * * * *